United States Patent [19]

Dehn et al.

[11] Patent Number: 5,026,201
[45] Date of Patent: Jun. 25, 1991

[54] FASTENING DEVICE

[75] Inventors: Klaus-Dieter Dehn, Mainz-Kostheim; Hans-Peter Weidner, Russelsheim; Eberhard A. Storch, Walldorf, all of Fed. Rep. of Germany

[73] Assignee: General Motors Corporation, Detroit, Mich.

[21] Appl. No.: 507,220

[22] Filed: Apr. 11, 1990

[30] Foreign Application Priority Data

Apr. 15, 1989 [DE] Fed. Rep. of Germany ..... 39124347

[51] Int. Cl.$^5$ .............................................. F16D 1/00
[52] U.S. Cl. ................................ 403/407.1; 411/410; 403/406.1
[58] Field of Search ............... 411/410, 401, 353, 349; 403/406.1, 407.1

[56] References Cited

U.S. PATENT DOCUMENTS 2,285,661 6/1942 Hryzack .............................. 411/553
2,631,348 3/1953 Bailey ................................... 411/349

FOREIGN PATENT DOCUMENTS 298044 10/1928 United Kingdom ............... 411/401

Primary Examiner—Andrew V. Kundrat
Attorney, Agent, or Firm—Charled E. Leahy

[57] ABSTRACT

A clamp part which is designed as a terminal strip is attached to a support part. A component, designed as a molding, has clamp bodies which can be located in the clamp part. Each clamp body has a rotatable shank which can be clamped in the clamp part in one position and can be withdrawn from the clamp part in another position. By this means, the component can be easily detached.

4 Claims, 2 Drawing Sheets

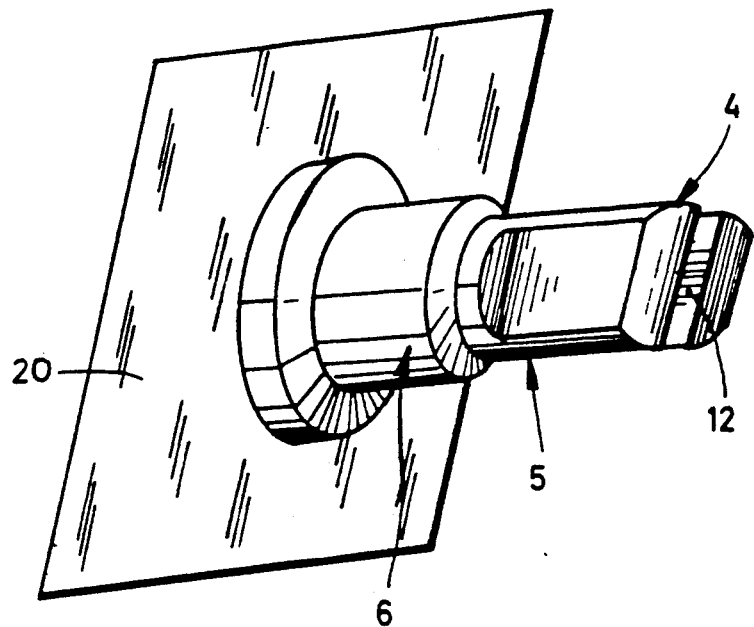
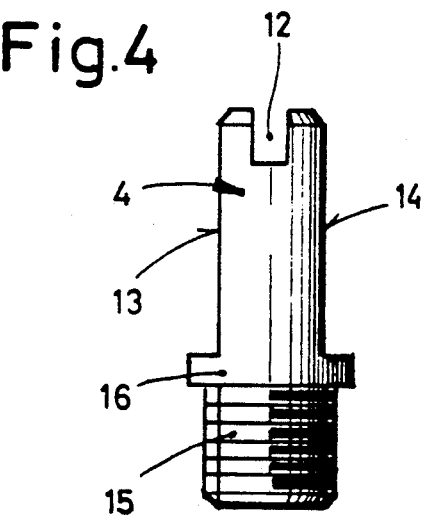
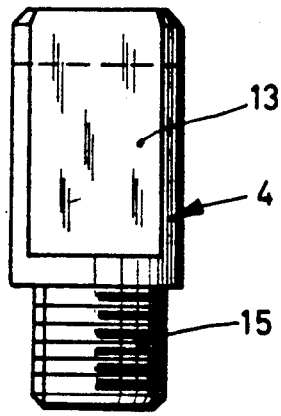
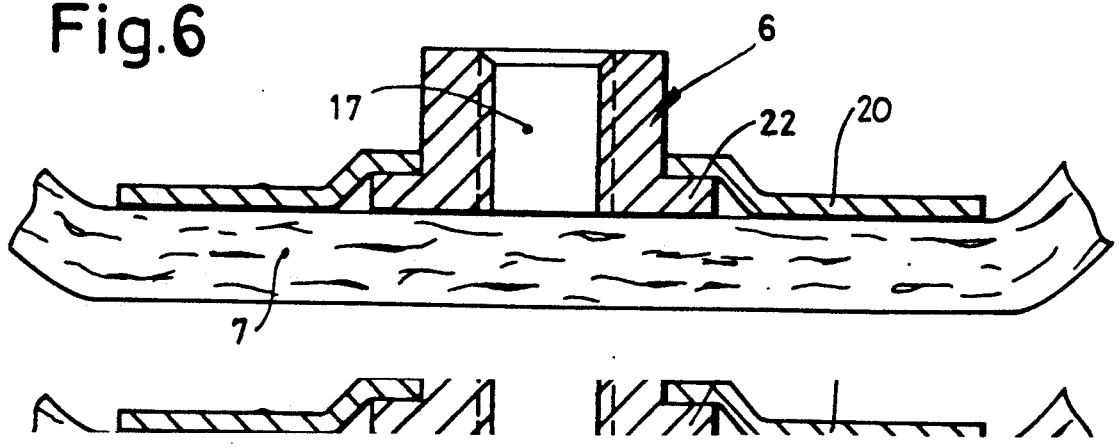

FASTENING DEVICE

The invention pertains to an attachment device consisting of a clamp part having clamp receptacles and clamp bodies designed for bonding to the component to be attached and capable of being inserted into the clamp receptacles with a shank.

BACKGROUND OF THE INVENTION

Attachment devices of this type are, for example, generally used in motor vehicles for attaching moldings and wheel covers and are therefore known. Such moldings are usually first mounted onto a support part that has not yet been mounted, which support part together with the molding is subsequently attached to the appropriate area of the motor vehicle. If the molding or wheel covers do not always appear completely uniform, which, for example, is unavoidably the case for real-wood veneer due to varying grain or varying color tone, then one must make sure that matching wheel covers and moldings are installed in a vehicle from a decorative point of view. Presently, in the assembly of a motor vehicle, this results in the support parts, which are provided with a molding corresponding to the appearance of the moldings mounted on them, are matched as a uniform kit which naturally represents a substantial expense.

The disadvantage in the known attachment devices is that the components to be attached, after they have been attached, can only be detached from the support part with difficulty. In the case of real-wood veneer, however, it is often necessary to replace all the moldings, even when only one has become defective because otherwise a uniform appearance is not produced due to varying grain.

The task of the invention is to design an attachment device of the type initially mentioned such that the components to be attached to it can be attached in a simple manner to a support part that is already mounted, and if necessary, can be detached again without damage to the components.

This task is solved in accordance with the invention in that the shank is connected rotatably to the head of the clamp body and has a diameter in one radial direction which leads to clamping in the clamp part and a diameter in another radial direction which eliminates clamping.

By means of this design, it is possible to bring the clamp body out of the clamp position into a position that removes the clamping by simply runing it on its shank, which makes it possible to pull the attached part with the clamp bodies off the support part. Therefore, moldings, wheel covers or the like can be quickly and easily detached without damage to the components.

The rotatability of the shank of the clamp bodies relative to their respective head can be especially simply achieved if the shank is screwed in with a threaded stem into a threaded boring of the head and rests with a collar on its head in the completely screwed-in position. A fixed position is produced by this collar as soon as the shank is completely screwed in. Therefore, under this condition, the head can be connected to the component to be attached such that the said shank is in an angle position leading to clamping. To detach it, the shank must then be rotated backwards, for example, by 90 degrees. The stop formed by the collar has the additional advantage of eliminating from within any unintentional rotation of the shank out of its clamp position.

The necesssary difference in diameter of the shank can be especially simply achieved when, in accordance with another variant of the invention, the difference in diameter is formed in two radial directions by two opposite flattenings of the shank.

For the purpose of preserving the clamping, the shank can be very easily rotated when an axial groove is provided in the front of the shank which is turned away from the head.

Also advantageous is another variant of the invention, according to which the clamp part having the clamp receptacles is a terminal strip which has fasteners for attaching to a support part to be provided with the component to be connected. By means of this characteristic, for example, in the case of mounting door panels outside the motor vehicle, only the terminal strips can first be attached to the door panels, and then the door panels can be installed in the motor vehicle. After finishing the moldings can be entirely mounted in the motor vehicle. Only then does this make it possible to match the moldings such that their grains match. Another advantage of the terminal strips is that the terminal strips can be attached to the respectively appropriate position of the support part for offsetting variations. It should also be emphasized that such a terminal strip can be made very flat such that a low overall height is obtained.

The terminal strip can be very simply attached to the support part when the fasteners are staples which are designed to be hammered into the support part and project away from the terminal strip.

BRIEF DESCRIPTION OF THE DRAWINGS

Numerous embodiments are made possible by the invention. To further illustrate its basic principle, one of these embodiments is illustrated in the drawing and is described below. In the drawing.

FIG. 3 shows a perspective view of a clamp body according to the invention.

FIG. 4 shows a view of a shank of the clamp body according to FIG. 3.

FIG. 5 shows a lateral view of the shank according to FIG. 4.

FIG. 6 shows a section through the head of the clamp body according to FIG. 3.

DESCRIPTION OF THE PREFERRED EMBODIMENT

Figure 1:
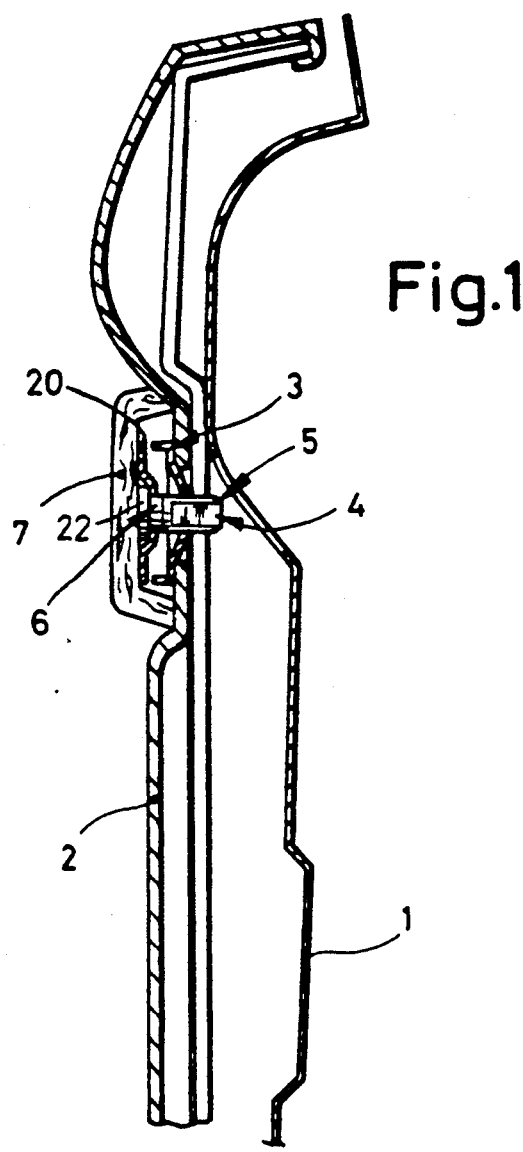
FIG. 1 shows a vertical section through a door area of a motor vehicle with the attachment device in accordance with the invention.

FIG. 1 illustrates a door structure 1, to which is attached a support part 2 designed as a door panel. Attached to the support part 2 is a clamp part 3 designed as a terminal strip, in which a shank 4 of a clamp body 5 is held by means of clamping force. The clamp body 5 has a head 6, which is connected to a component 7, designed as a molding, by means of clamping, gluing, pressing or by other means. The component 7 can be removed with the clamp body 5 and with the clamp bodies (not shown) of the clamp part 3 when the shanks 4 of the clamp bodies 5 are rotated beforehand by about 90 degrees relative to the heads 6, which is explained below.

Figure 2:
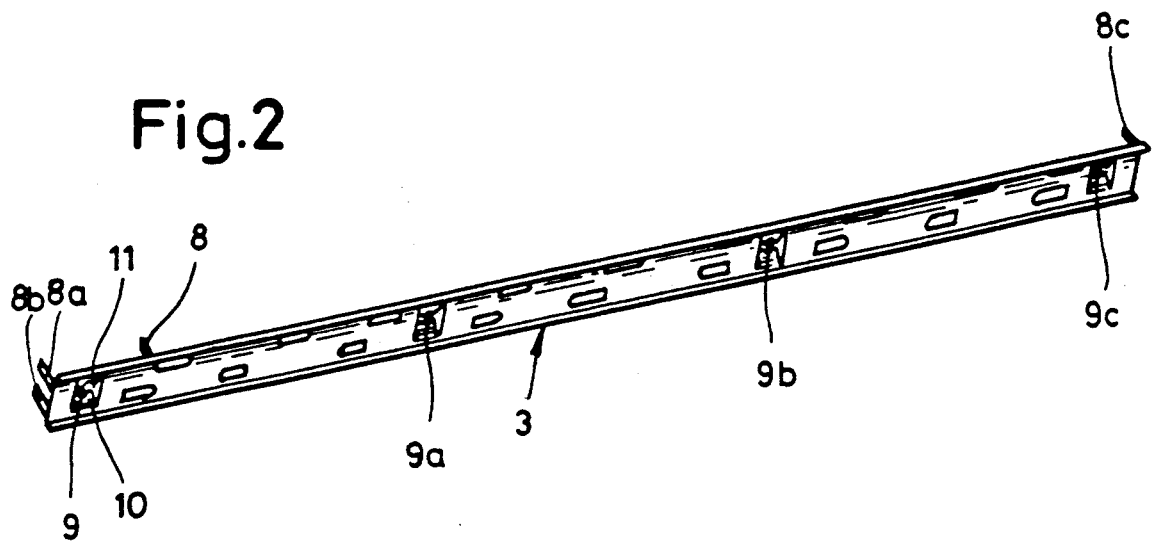
FIG. 2 shows a perspective view of a clamp part of the attachment device according to FIG. 1.

FIG. 2 shows the clamp part 3 designed as a terminal strip in perspective view. It can be seen that this clamp part 3 has clamps 8, 8a, 8b and 8c displayed diagonally to their main extension planes, which makes it possible to attach the clamp part 3 to the support part 2 by hammering in. Clamp receptacles 9, 9a, 9b and 9c, which are formed respectively by two clamp springs 10 and 11 directed to each other, are arranged on the clamp part 3 equidistant to each other.

It can be seen in FIG. 4 that the shank 4 of the clamp body 5 is flattened and has an axial groove 12 in its front. This makes it possible to rotate the shank 4 relative to its head 6 by means of a tool gripping in the groove 12.

FIG. 4 shows that the shank 4 has a flattening 13, 14 on opposite sides. It can also be seen that the shank 4 has a coaxial threaded stem 15 which is separated from the shank 4 by a collar 16.

In FIG. 5, the flattening 13 points toward the front. In this position, the diameter of the shank 4 is therefore greater than in the position according .o FIG. 4

FIG. 6 shows the head 6 connected to the molding 6 by a plate 20 which engages a shoulder 22 of the head 6 and is glued or stapled to the molding 7. The plate 20 prevents the head 6 from rotating. It can be seen in FIG. 6 that the head 6 has a threaded boring 17, into which the threaded stem 15 of the shank 4 can be screwed until the collar 16 rests on the head 6.

A support part 2 designed as a door panel can be provided with the clamp part 3 before the panel is attached to the door. In order to install the component 7, the clamp bodies 5 are each rotated so that the flattened points 13 and 14 will engage with the clamp springs 10 and 11 in the clamp receptacles 9, 9a, 9b, and 9c to permit the molding to be easily installed. Then, a tool such as a screw driver is used to grip the groove 12 and rotate the shanks 5 about 90° relative to the heads 6 so that the greater diameter portion of the shanks 4 will engage with the clamp springs 10 and 11. The support part 2 is then placed onto the door structure 1. The components 7, designed as moldings which are made of real wood for example, can be entirely simply attached to the clamp part 3 at the end of the assembly process and later, if necessary, can again be detached by rotating on the shanks 4.

In addition, the component 7 may be installed without rotating the clamp bodies 5 by the pushing or hammering the clamp bodies 5 into the clamps 8, 8a, 8b, and 8c.

The embodiments of the invention in which an exclusive property or privilege is claimed are defined as follows:

1. Device for attaching a component to a support comprising:

a receptacle element mounted on the support and having a plurality of receptacle openings therein and having opposed facing clamp springs projecting into the receptacle openings, and a plurality of clamp bodies rotatably mounted on the component and arranged to register with the receptacle openings, each such clamp body being a cylindrical shank and having flattened surfaces on the opposite sides thereof, the rotation of the clamp bodies to a first rotary condition aligning the flattened surfaces with the clamp springs permitting the insertion of the clamp bodies into the receptacle openings, the rotation of the clamp bodies 90 degrees from the first rotary condition causing the cylindrical shank to engage with the clamp springs to thereby attach the component to the support.

2. The device of claim 1 further characterized by the clamp bodies having a threaded shank and being threaded into the threaded bore of a head attached to the component so that the clamp bodies are rotatably mounted on the component by the threaded engagement of the threaded shank in the threaded bore.

3. The device of claim 2 further characterized by the shank having an axial groove in an end thereof so that the clamp body may be rotated.

4. Device for attaching a component to a support comprising:

a receptacle element mounted on the support and having a plurality of receptacle openings therein and having opposed facing clamp springs projecting into the receptacle openings, and a plurality of clamp bodies rotatably mounted on the component and arranged to register with the receptacle openings, each such clamp body being a cylindrical shank and having flattened surfaces on the opposite side thereof, the rotation of the clamp bodies to a rotary condition preventing alignment of the flattened surfaces with the clamp springs permitting the forced insertion of he clamp bodies into the receptacle openings as permitted by yielding of the clamp springs, the rotation of the clamp bodies 90 degrees from the rotary condition preventing alignment of the flattened surfaces with the clamp springs permitting causing the flattened surfaces to align with the clamp springs to thereby permit the removal of the component from the support.

* * * * *